United States Patent
Huang et al.

(10) Patent No.: US 9,240,741 B2
(45) Date of Patent: Jan. 19, 2016

(54) AC MOTOR

(75) Inventors: Yueh-Lung Huang, Taoyuan Hsien (TW); Tsung-Jung Hsieh, Taoyuan Hsien (TW); Yen-Hung Wu, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 860 days.

(21) Appl. No.: 13/242,354

(22) Filed: Sep. 23, 2011

(65) Prior Publication Data

US 2012/0286711 A1  Nov. 15, 2012

(30) Foreign Application Priority Data

May 10, 2011 (TW) .............................. 100116231 A

(51) Int. Cl.
*H02P 6/14* (2006.01)
*H02P 6/00* (2006.01)
*H02P 6/16* (2006.01)

(52) U.S. Cl.
CPC *H02P 6/16* (2013.01); *H02P 6/008* (2013.01); *H02P 2207/05* (2013.01)

(58) Field of Classification Search
CPC ..................................... H02P 6/14; H02P 6/00
USPC .............................. 318/400.01, 400.26, 700
See application file for complete search history.

(56) References Cited

U.S. PATENT DOCUMENTS

| | | | |
|---|---|---|---|
| 7,759,889 B2 * | 7/2010 | Hirata ...................... | 318/400.29 |
| 8,624,535 B2 * | 1/2014 | Wang et al. .............. | 318/400.26 |
| 2006/0028261 A1 * | 2/2006 | Hsieh et al. ................... | 327/423 |
| 2007/0160354 A1 * | 7/2007 | Wu et al. ........................ | 388/811 |
| 2007/0258805 A1 * | 11/2007 | Liu et al. ......................... | 415/47 |
| 2009/0160382 A1 * | 6/2009 | Hwang et al. ............. | 318/400.26 |
| 2010/0164420 A1 * | 7/2010 | Wu et al. .................. | 318/400.41 |
| 2011/0068723 A1 * | 3/2011 | Maiocchi ................... | 318/400.3 |
| 2011/0084637 A1 * | 4/2011 | Takeuchi ................. | 318/400.26 |

* cited by examiner

*Primary Examiner* — Kawing Chan
(74) *Attorney, Agent, or Firm* — Muncy, Geissler, Olds & Lowe, P.C.

(57) ABSTRACT

An embodiment of the invention provides an AC motor that is driven by an AC voltage. The AC motor includes a motor coil, a switch circuit, a position detector and a controller. The motor coil receives the AC voltage to drive an axis of the motor. The switch circuit is coupled to the motor coil and controls a current passing through the motor coil. The position detector detects the position of a motor rotor to output a polarity signal. The controller controls the switch circuit according to the polarity signal and the AC voltage to make the current to be a first current with a first direction or a second current with a second direction.

6 Claims, 3 Drawing Sheets

AC MOTOR

CROSS REFERENCE TO RELATED APPLICATIONS

This application claims priority of Taiwan Patent Application No. 100116231, filed on May 10, 2011, the entirety of which is incorporated by reference herein.

BACKGROUND OF THE INVENTION

1. Field of the Invention

The present invention relates to a motor and more particularly to an AC motor.

2. Description of the Related Art

The conventional AC motor is not easily added new electronic control means due to the bulky and heavy motor, and thus is replaced by the DC motor gradually. AC voltage is first transformed into DC voltage and then a DC motor is driven by the DC voltage via a full bridge converter or a half bridge converter. At present, the AC voltage is transformed into the DC voltage by a full-wave rectifier or half-wave rectifier, but the performance is not good and easily causes undesired power consumption.

BRIEF SUMMARY OF THE INVENTION

An embodiment of the invention provides an AC motor driven by an AC voltage. The AC motor comprises a motor coil, a switch circuit, a position detector, a controller and an AC/DC transformer. The motor coil receives the AC voltage. The switch circuit is electrically connected to the motor coil and controls a current passing through the motor coil. The position detector comprises a Hall element and detects a position of a rotor and outputting a polarity signal. The controller receives the polarity signal from the position detector, and controls the switch circuit to make the current be a first current with a first direction or a second current with a second direction according to the AC voltage and the polarity signal, wherein the first direction is opposite to the second direction. The AC/DC transformer converts the AC voltage into a DC voltage and outputs the DC voltage to the controller and the position detector.

An embodiment of the invention provides an AC motor driven by an AC voltage. The AC motor comprises a first motor coil, a second motor coil, a switch circuit, a position detector, a controller and an AC/DC transformer. The first motor coil and the second motor coil receive the AC voltage. The switch circuit is electrically connected to the first motor coil and the second motor coil to control a first current passing through the first motor coil or a second current passing through the second motor coil. The position detector comprises a Hall element to detect a position of a rotor and outputting a polarity signal. The controller receives the polarity signal from the position detector, and controls the switch circuit to make the current be the first current with a first direction or the second current with a second direction according to the AC voltage and the polarity signal, wherein the first direction is opposite to the second direction. The AC/DC transformer converts the AC voltage into a DC voltage and outputs the DC voltage to the controller and the position detector.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
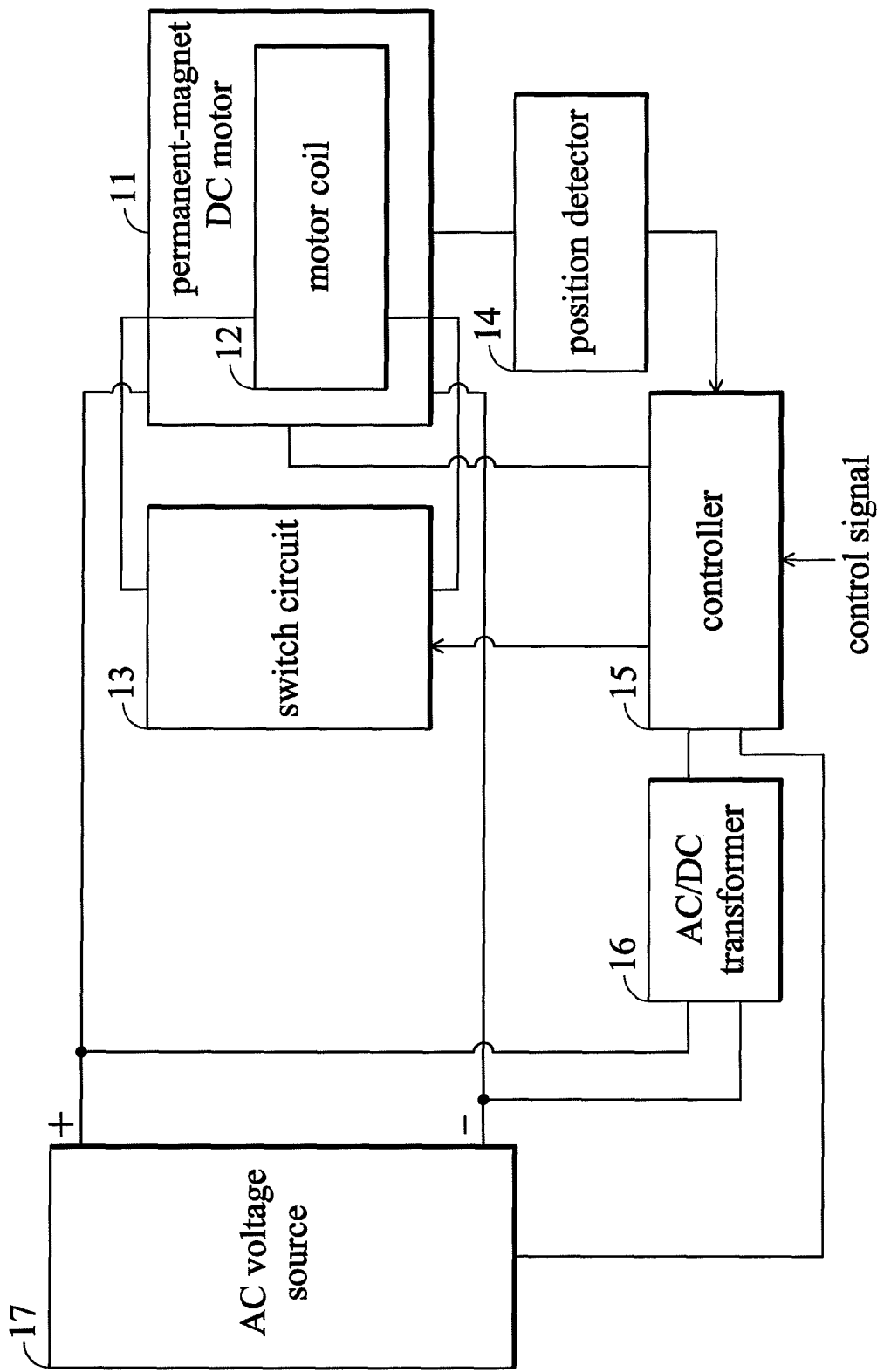
FIG. 1 is a schematic diagram of an embodiment of an AC motor system according to the invention.

FIG. 1 is a schematic diagram of an embodiment of an AC motor system according to the invention. In FIG. 1, all the elements except the AC voltage source 17 can be integrated into the permanent-magnet DC motor 11. The permanent-magnet DC motor 11 can be directly driven by an AC voltage provided by the AC voltage source 17. The switch circuit 13 controls a current direction of the current passing through the motor coil 12 of the permanent-magnet DC motor 11 and the current direction comprises at least two different directions. The position detector 14 detects the position of at least one motor rotor of the permanent-magnet DC motor 11 to determine a polarity of a magnetic force received by the motor rotor, wherein the magnetic force is generated by a permanent-magnet of the permanent-magnet DC motor 11. The position detector 14 outputs a polarity signal to represent whether the current polarity of the magnetic force received by the motor rotor is S or N. In this embodiment, the position detector 14 comprises a Hall element.

The AC/DC transformer 16 converts the AC voltage from the AC voltage source 17 into a DC voltage and provides the DC voltage to the controller. In this embodiment, the AC/DC transformer 16 outputs the DC voltage to the elements except for the permanent-magnet DC motor 11 in the AC motor system. The controller 15 further receives a first signal of the AC voltage, wherein the first signal represents whether the current voltage of the AC voltage is positive or negative. The controller 15 controls the switch circuit 13 to output a first current with a first direction A1 or a second current with a second direction A2 according to the first signal and the polarity signal. Furthermore, the controller 15 can control the magnitude of the first current or a second current by a pulse width modulation circuit.

Figure 2:
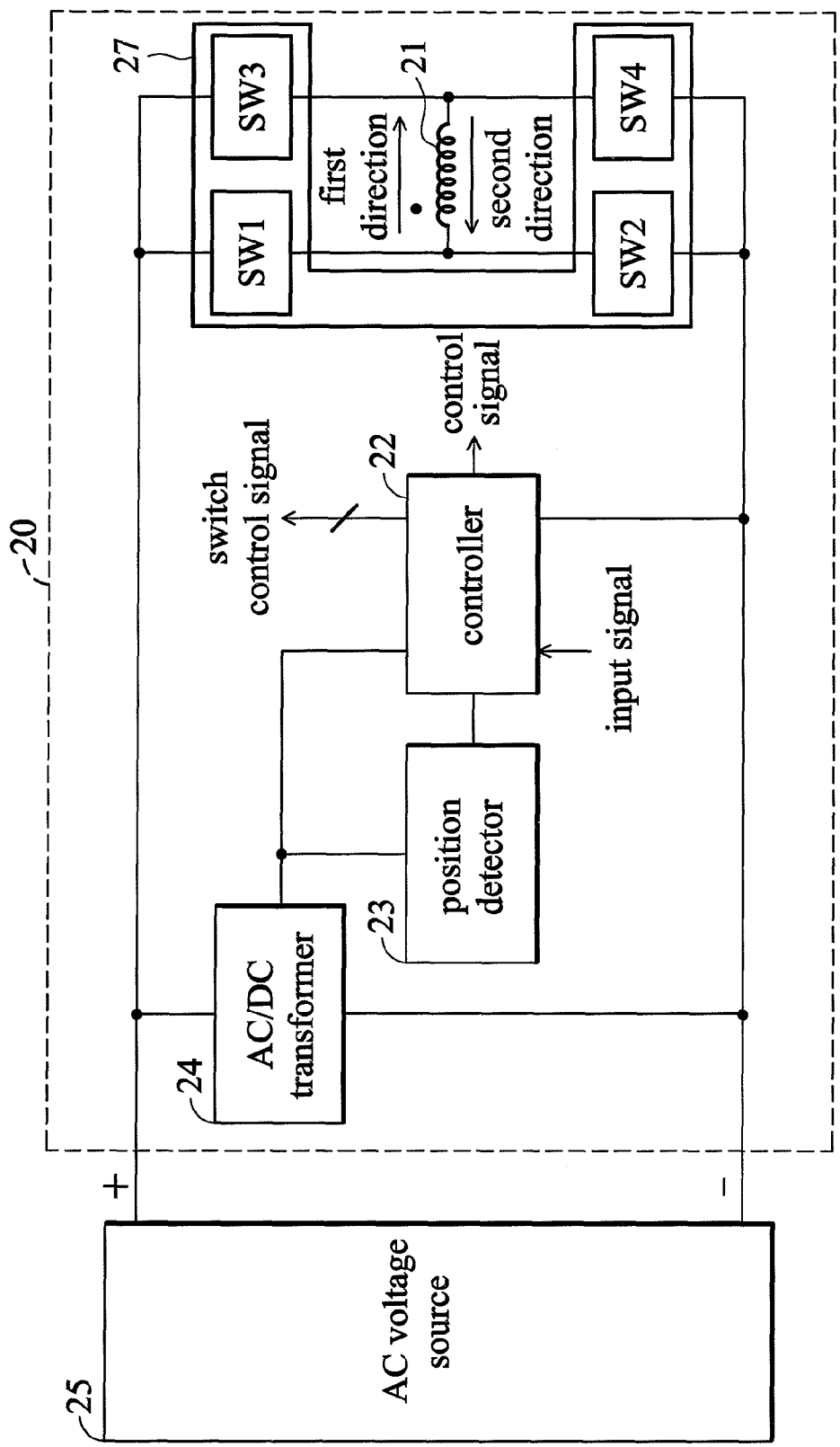
FIG. 2 is a schematic of an embodiment of an AC motor according to the invention.

FIG. 2 is a schematic of an embodiment of an AC motor according to the invention. The permanent-magnet DC motor 20 is coupled to an AC voltage source 25 and driven by an AC voltage provided by the AC voltage source 25. The permanent-magnet DC motor 20 comprises a motor coil 21, a controller 22, a position detector 23, an AC/DC transformer 24 and a switch circuit 27 comprising switch devices SW1~SW4. The switch circuit 27 electrically connects to the motor coil 21 and controls a current passing through the motor coil. The position detector 23 detects the position of at least one motor rotor of the permanent-magnet DC motor 20 to determine a polarity of a magnetic force received by the motor rotor, wherein the magnetic force is generated by a permanent-magnet of the permanent-magnet DC motor 20.

The position detector 23 outputs a polarity signal to represent whether the current polarity of the magnetic force received by the motor rotor is S or N. In this embodiment, the position detector 23 comprises a Hall element. The AC/DC transformer 24 converts the AC voltage from the AC voltage source 25 into a DC voltage and provides the DC voltage to the controller 22. In this embodiment, the AC/DC transformer 24 outputs the DC voltage to the elements except for the motor coil 21 in the AC motor. The controller 22 outputs a switch control signal to control the switch devices SW1~SW4 to be turned on or turned off. In this embodiment, the switch devices SW1~SW4 are implemented by at least one MOS transistor, especially to the MOST transistors without a body diode.

When the position detector 23 detects that the current polarity of the magnetic force received by the motor rotor is N and the AC voltage is in a positive period, i.e. the AC voltage is a positive voltage, the controller 22 controls the switch devices SW1 and SW4 to be turned on, and the direction of the current passing through the motor coil 21 is the first direction A1. In FIG. 2, the first direction A1 is the direction from the coil start terminal to the coil end terminal of the motor coil 21, and the block dot of the motor coil 21 represents the coil start terminal. When the position detector 23 detects that the current polarity of the magnetic force received by the motor rotor is N and the AC voltage is in a negative period, i.e. the AC voltage is a negative voltage, the controller 22 controls the switch devices SW2 and SW3 to be turned on, and the direction of the current passing through the motor coil 21 is the first direction A1. When the position detector 23 detects that the current polarity of the magnetic force received by the motor rotor is S and the AC voltage is in the positive period, the controller 22 controls the switch devices SW2 and SW3 to be turned on, and the direction of the current passing through the motor coil 21 is the second direction A2. When the position detector 23 detects that the current polarity of the magnetic force received by the motor rotor is S and the AC voltage is in a negative period, the controller 22 controls the switch devices SW1 and SW4 to be turned on, and the direction of the current passing through the motor coil 21 is the second direction A2.

Moreover, the controller 22 receives an input signal to output a corresponding control signal to control the rotation speed of the permanent-magnet DC motor 20 or output the current rotation speed of the permanent-magnet DC motor 20. The controller 22 adjusts the switch control signal by a pulse width modulation circuit to control the turned-on time period of the switch devices SW1~SW4. Accordingly, the controller 22 can control the magnitude of the current passing through the motor coil 21 to control the rotation speed of the permanent-magnet DC motor 20. In this embodiment, the permanent-magnet DC motor 20 is further connected to a fan and the fan is rotated by the driving of the permanent-magnet DC motor 20. Since the permanent-magnet DC motor 20 can be directly driven by the AC voltage, the full-wave rectifier or the half-wave rectifier that is used to transform the AC voltage into the DC voltage can be omitted.

Figure 3:
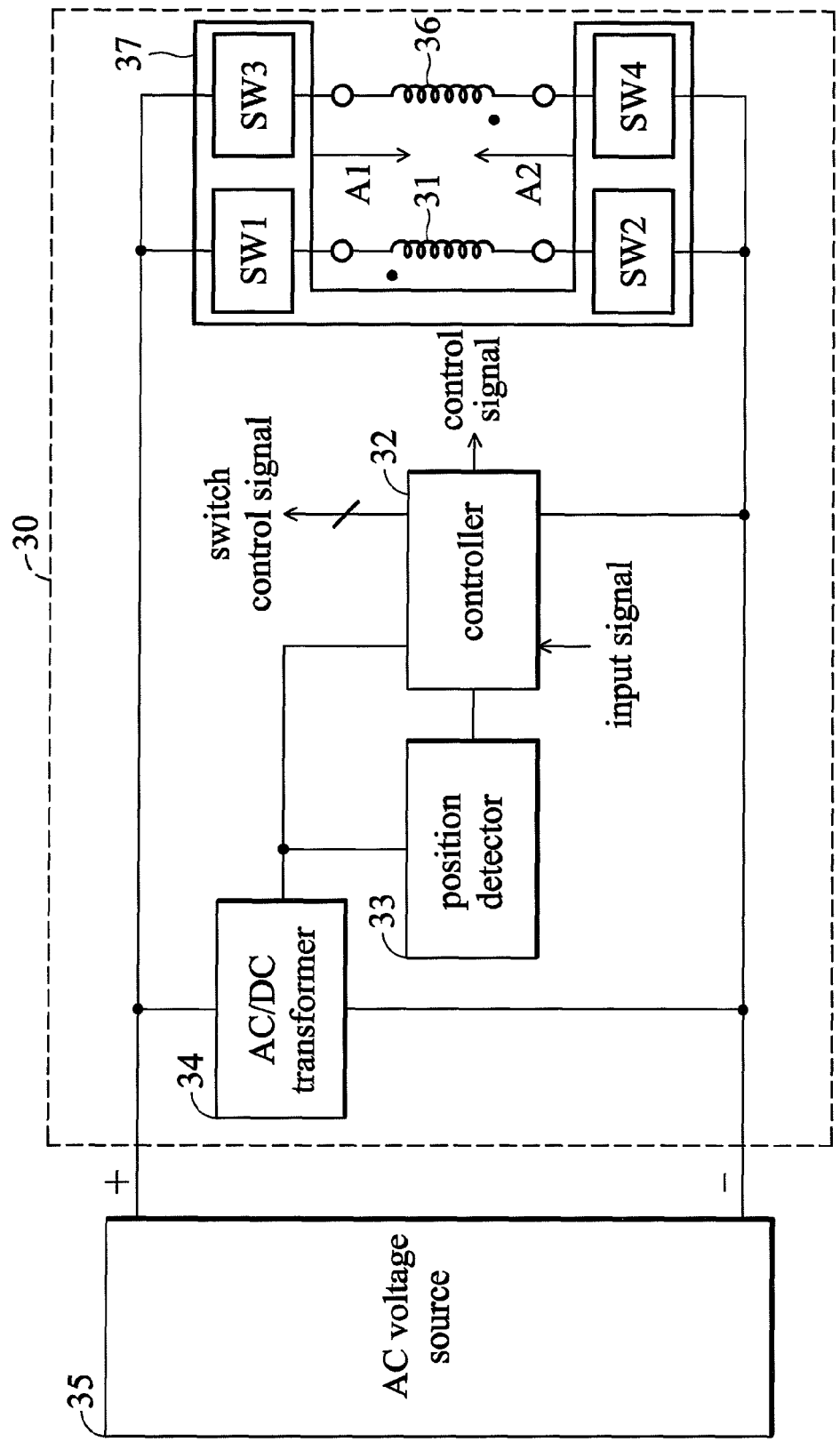
FIG. 3 is a schematic of another embodiment of an AC motor according to the invention.

FIG. 3 is a schematic of another embodiment of an AC motor according to the invention. In this embodiment, the permanent-magnet DC motor 30 comprises a first motor coil 31 and a second motor coil 36 that respectively controls an axis of the permanent-magnet DC motor 30. It is noted that the current only passes through one of the first motor coil 31 and the second motor coil 36 at one time in this embodiment. The permanent-magnet DC motor 30 is electrically connected to an AC voltage source 35 and driven by an AC voltage provided from the AC voltage source 35. Accordingly, the control circuit of the motor can be simplified and the power consumption of the motor can also be reduced. The permanent-magnet DC motor 30 comprises the first motor coil 31, a controller 32, a position detector 33, an AC/DC transformer 34, a switch circuit 37 comprising switch devices SW1~SW4 and the second motor coil 36. The position detector 33 detects the position of a motor rotor of the permanent-magnet DC motor 30 to determine a polarity of a magnetic force received by the motor rotor, wherein the magnetic force is generated by a permanent-magnet of the permanent-magnet DC motor 30. The position detector 33 outputs a polarity signal to represent whether the current polarity of the magnetic force received by the motor rotor is S or N. In this embodiment, the position detector 33 comprises a Hall element.

The AC/DC transformer 34 converts the AC voltage from the AC voltage source 35 into a DC voltage and provides the DC voltage to the controller 32 and the position detector 33. In this embodiment, the AC/DC transformer 34 output the DC voltage to the elements except for the first motor coil 31 and the second motor coil 36 in the AC motor. The controller 32 outputs a switch control signal to control the switch devices SW1~SW4 to be turned on or turned off. In this embodiment, the switch devices SW1~SW4 are implemented by at least one MOS transistor, especially to the MOST transistors without a body diode. The controller 32 can output an independent switch control signal to each switch device and adjust the turned-on time period by adjusting the duty cycle of each switch control signal. When the position detector 33 detects that the current polarity of the magnetic force received by the motor rotor is N and the AC voltage is in a positive period, i.e. the AC voltage is a positive voltage, the controller 32 controls the switch devices SW1 and SW2 to be turned on, and the switch devices SW3 and SW4 to be turned off, and the current is therefore passed through the first motor coil 31. The direction of the current passing through the first motor coil 31 is from the switch device SW1 to the switch device SW2. In the following paragraph, the direction from the switch device SW1 to the switch device SW2 is called the first direction A1. When the position detector 33 detects that the current polarity of the magnetic force received by the motor rotor is N and the AC voltage is in a negative period, i.e. the AC voltage is a negative voltage, the controller 32 turns off the switch devices SW1 and SW2, turns on the switch devices SW3 and SW4, and the current is therefore passed through the second motor coil 36. The direction of the current passing through the second motor coil 36 is from the switch device SW4 to the switch device SW3. In the following paragraph, the direction from the switch device SW4 to the switch device SW3 is called the second direction A2. When the position detector 33 detects that the current polarity of the magnetic force received by the motor rotor is S and the AC voltage is in the positive period, the controller 32 turns on the switch devices SW1 and SW2, and turns off the switch devices SW3 and SW4, and the current is therefore passed through the first motor coil 31. The direction of the current passing through the first motor coil 31 is from the switch device SW2 to the switch device SW1 which is the same as the second direction A2.

Moreover, the controller 32 receives an input signal to output a corresponding control signal to control the rotation speed of the permanent-magnet DC motor 30 or output the current rotation speed of the permanent-magnet DC motor 30. The controller 32 adjusts the switch control signal by a pulse width modulation circuit to control the turned-on time period of the switch devices SW1~SW4. Accordingly, the controller 32 can control the magnitude of the current passing through the first motor coil 31 and the second motor coil 36 to control the rotation speed of the permanent-magnet DC motor 30. In this embodiment, the permanent-magnet DC motor 30 is further connected to a fan and the fan is rotated by the driving of the permanent-magnet DC motor 30.

When the position detector 33 detects that the current polarity of the magnetic force received by the motor rotor is S and the AC voltage is in the negative period, the controller 32 controls the switch devices SW1 and SW2 to be turned off, and the switch devices SW3 and SW4 to be turned on, and the current is therefore passed through the second motor coil 36. The direction of the current passing through the second motor coil 36 is from the switch device SW3 to the switch device SW4 which is the same as the first direction A1.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A DC motor driven by an AC voltage from an AC power source, comprising:
    a motor coil;
    a switch circuit electrically connected to the motor coil for controlling a current passing through the motor coil, wherein the switch circuit is further connected between a positive terminal of the AC power source and a negative terminal of the AC power source;
    a position detector, comprising a Hall element, for detecting a position of a rotor and outputting a magnetic polarity signal;
    a controller for receiving the magnetic polarity signal from the position detector, and controlling the switch circuit to make the current be a first current with a first direction or a second current with a second direction according to an electrical polarity of the AC voltage and the magnetic polarity signal, wherein the first direction is opposite to the second direction, and the electrical polarity is positive or negative; and
    an AC/DC transformer for converting the AC voltage into a DC voltage, and outputting the DC voltage to the controller and the position detector.

2. The DC motor as claimed in claim 1, wherein the AC voltage is provided by an AC voltage source, and the switch circuit comprises:
    a first switch device, electrically connected between a positive input terminal of the AC voltage source and a first terminal of the motor coil;
    a second switch device, electrically connected between a negative input terminal of the AC voltage source and the first terminal of the motor coil;
    a third switch device, electrically connected between the positive input terminal of the AC voltage source and a second terminal of the motor coil; and
    a fourth switch device, electrically connected between the negative input terminal of the AC voltage source and the second terminal of the motor coil.

3. The DC motor as claimed in claim 2, wherein when the AC voltage is positive voltage and the magnetic polarity signal is a first polarity signal, the first switch device and the fourth switch device are turned on, the second switch device and the third switch device are turned off, and the current is the first current with the first direction.

4. The DC motor as claimed in claim 2, wherein when the AC voltage is positive voltage and the magnetic polarity signal is a second polarity signal, the first switch device and the fourth switch device are turned off, the second switch device and the third switch device are turned on, and the current is the first current with the first direction.

5. The DC motor as claimed in claim 2, wherein when the AC voltage is negative voltage and the magnetic polarity signal is a first polarity signal, the first switch device and the fourth switch device are turned off, the second switch device and the third switch device are turned on, and the current is the second current with the second direction.

6. The DC motor as claimed in claim 2, wherein when the AC voltage is negative voltage and the magnetic polarity signal is a second polarity signal, the first switch device and the fourth switch device are turned on, the second switch device and the third switch device are turned off, and the current is the second current with the second direction.

* * * * *